United States Patent [19]
Whitman

[11] Patent Number: 6,089,674
[45] Date of Patent: Jul. 18, 2000

[54] LOCKABLE WHEEL SPINDLE ASSEMBLY

[75] Inventor: Duff C. Whitman, Torrance, Calif.

[73] Assignee: Radloc Enterprises, LLC, Torrance, Calif.

[21] Appl. No.: 09/055,070

[22] Filed: Apr. 3, 1998

[51] Int. Cl.$^7$ .............................. B60B 27/06; F15B 15/26
[52] U.S. Cl. ........................... 301/111; 301/35.63; 92/15; 403/31; 403/322.3
[58] Field of Search ...................... 296/180.1; 301/35.63, 301/111, 112, 120, 122, 124.1, 35.61; 403/31, 371, 322.3, 368; 92/15, 17, 20, 27, 28, 130 A

[56] References Cited

U.S. PATENT DOCUMENTS

| | | | |
|---|---|---|---|
| 351,095 | 10/1886 | Clark | 301/112 |
| 464,977 | 12/1891 | Logsdon et al. | 301/112 |
| 1,465,958 | 8/1923 | Wheeler | 301/35.58 |
| 3,070,015 | 12/1962 | Ledwith | 102/49 |
| 3,917,425 | 11/1975 | Allaben, Jr. | 403/371 |
| 4,090,731 | 5/1978 | Bopp et al. | 296/28 C |
| 4,118,989 | 10/1978 | Wood | 73/487 |
| 4,132,147 | 1/1979 | Contaldo | 89/1.5 G |
| 4,477,121 | 10/1984 | Atkins | 301/112 |
| 4,615,101 | 10/1986 | Edwards et al. | 29/568 |
| 4,770,053 | 9/1988 | Broderick et al. | 73/866.5 |
| 4,789,280 | 12/1988 | Dobat et al. | 409/233 |
| 4,833,760 | 5/1989 | Sundstrom | 24/609 |
| 4,998,842 | 3/1991 | Sheridan | 403/252 |
| 5,013,178 | 5/1991 | Baker et al. | 403/330 |
| 5,040,915 | 8/1991 | Stuart et al. | 403/322 |
| 5,143,427 | 9/1992 | Dick | 301/111 |
| 5,269,620 | 12/1993 | Williams et al. | 403/316 |
| 5,408,854 | 4/1995 | Chiu | 70/225 |
| 5,439,310 | 8/1995 | Evenson et al. | 403/321 |
| 5,647,828 | 7/1997 | Chen | 482/132 |
| 5,860,776 | 1/1999 | Sato et al. | 409/233 |

*Primary Examiner*—D. Glenn Dayoan
*Assistant Examiner*—Paul Chenevert
*Attorney, Agent, or Firm*—Sheppard, Mullin, Richter & Hampton LLP; James R. Brueggemann

[57] ABSTRACT

A spindle assembly for reliably locking a vehicle wheel to a vehicle. The spindle assembly includes a slotted sleeve that is engageable with a central opening of the wheel, to cooperate with a plurality of lugs in locking the wheel in place. The slotted sleeve incorporates a number of deflectable fingers, and a mandrel can be reciprocated along the sleeve's longitudinal axis, between an extended position and a retracted position. When the mandrel is in its extended position, the sleeve's deflectable fingers are moved to a position that allows the wheel to be removed and replaced, whereas when the mandrel is in its retracted position, the fingers are moved into engagement with the wheel, to positively lock the wheel in place. A compressible coil spring biases the mandrel to its retracted position, but the application of a positive hydraulic pressure to the spindle assembly overcomes this spring bias, to move the mandrel to its retracted position. The wheel thereby can be removed and replaced without the need for any supplementary tools. The spindle assembly has particular utility if it is combined with a jack mechanism, such that applying a pressurized fluid (liquid or gas) to the vehicle simultaneously activates both the jack mechanism and the spindle assemblies, to lift the vehicle's wheels off of the ground and simultaneously unlock the wheels.

19 Claims, 3 Drawing Sheets

LOCKABLE WHEEL SPINDLE ASSEMBLY

BACKGROUND OF THE INVENTION

This invention relates generally to spindle assemblies for mounting vehicle wheels and, more particularly, to spindle assemblies configured to lock the wheels in their mounted positions.

Motor vehicle wheels typically are mounted to the vehicles using a plurality of lug nuts or, alternatively, using just a single locknut for each wheel. In such latter cases, the wheel typically includes a circular central opening sized to slidably mount over a threaded spindle, and a locknut then is threaded onto the spindle, to secure the wheel in place. A plurality of lugs prevent the wheel from turning relative to the spindle. This latter means of wheel attachment is commonly used in racing applications, where the wheels sometimes must be removed and replaced as rapidly as possible.

In such racing applications, the race car's wheels typically are replaced by connecting a pressurized air or nitrogen source to the race car, to activate a jack mechanism that raises the four wheels above the ground. A separate crew member then uses a handheld pneumatic tool to remove the single locknut that secures each wheel in place, after which the wheel is removed and replaced and the locknut is then reattached using the same handheld pneumatic tool.

The procedure described briefly above for removing and replacing a race car's four wheels generally has proven to be effective and reliable. Nevertheless, a continuing need remains for a wheel locking mechanism that facilitates an even faster procedure for removing and replacing the wheels, but without sacrificing the reliability of the wheels' securement. The present invention satisfies this need and provides further related advantages.

SUMMARY OF THE INVENTION

The present invention is embodied in a lockable wheel spindle assembly for releasably mounting a vehicle wheel, which facilitates a rapid removal and replacement of the wheel, but without sacrificing the reliability of the wheel's securement. The spindle assembly includes a sleeve having a plurality of fingers spaced uniformly from a spindle axis and movable between a retracted position, in which the fingers are positioned to allow a vehicle wheel to be slidably mounted thereon, and an extended position, in which the fingers are positioned to lock the vehicle wheel in place. A cam, which is engageable with the sleeve, reciprocates between an unlocked position, in which the plurality of fingers of the sleeve are each in their retracted position and the vehicle wheel can be slidably removed and replaced, and a locked position, in which the cam urges the fingers to their extended position, to lock the vehicle wheel in place. A spring-bias device biases the cam to its locked position, and an actuator selectively moves the cam to its unlocked position, overcoming the bias of the spring-bias device.

In more detailed features of the invention, the sleeve includes a generally cylindrical wall having a central longitudinal axis that defines the spindle axis and further having a plurality of uniformly spaced slots (e.g., 16 slots) that define the plurality of fingers. The fingers preferably are flexible, and they are in their unflexed state when in the retracted positions, but flexed radially outward when in their extended positions. The cam preferably has the form of a mandrel located radially inward of the plurality of fingers, which reciprocates in directions aligned with the spindle axis, between its locked and unlocked positions. Further, the radially inward surface of each finger has a bevel that conformably engages a bevel formed in the radial outward surface of the cam.

In other more detailed features of the invention, the actuator of the spindle assembly includes a hydraulic piston assembly, and a pressurized fluid is selectively provided to this piston assembly by a rotary coupler. The rotary coupler includes a non-rotatable section secured to the vehicle's suspension arms and a rotatable section that mounts to the sleeve, the cam, the spring-bias device, and the actuator, for rotation with the vehicle wheel about the spindle axis. The spring-bias device can take the form of a compressible coil spring or a Bellville washer system, engaging the hydraulic piston assembly.

In yet further more detailed features of the invention, the opening formed in the wheel is centrally located and it has a circular cross-section, with a predetermined irregular shape in the direction of the spindle axis. The radial outward surfaces of the plurality of fingers of the sleeve have a predetermined irregular shape in the direction of the spindle axis that complements the irregular shape of the opening formed in the wheel. In addition, the opening formed in the wheel is defined by a hard sleeve insert.

In a separate feature of the invention, a plurality of such spindle assemblies are used on a vehicle that further incorporates a fluid-actuatable lift mechanism for lifting the vehicle sufficiently to space the wheels above the ground. A source of pressurized fluid (gas or air) can simultaneously actuate both the lift mechanism and the actuators of the plurality of spindle assembly, to raise the wheels off of the ground and to move the plurality of fingers of each spindle assembly to their retracted positions, such that the wheels can be removed and replaced.

Other features and advantages of the present invention should become apparent from the following description of the preferred embodiment, taken in conjunction with the accompanying drawings, which illustrate, by way of example, the principles of the invention.

DESCRIPTION OF THE PREFERRED EMBODIMENT

Figure 1:
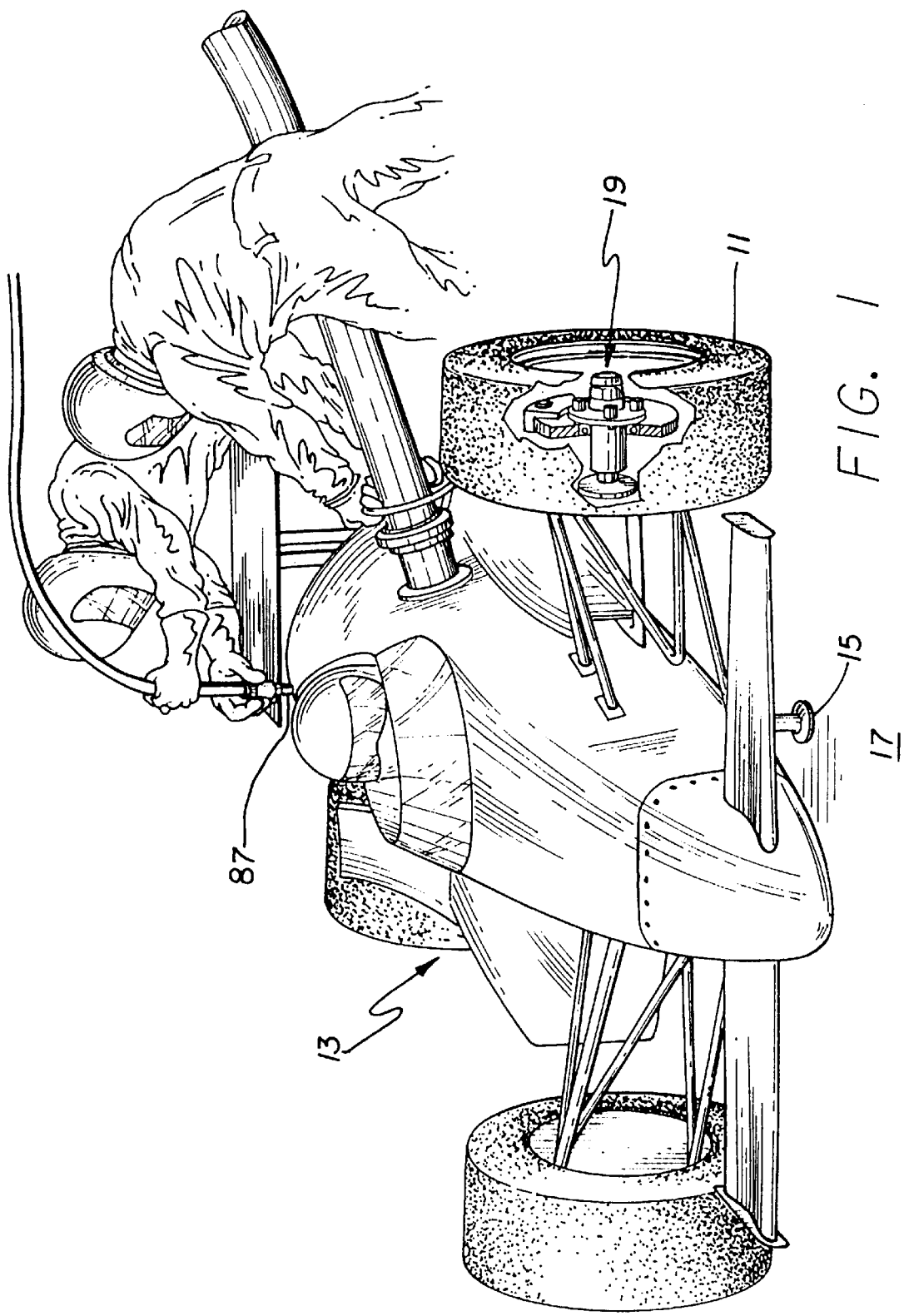
FIG. 1 is a fragmentary elevational view of a vehicle, showing one of the vehicle's wheels lifted above the ground by a pneumatic jack mechanism.
Figure 2:
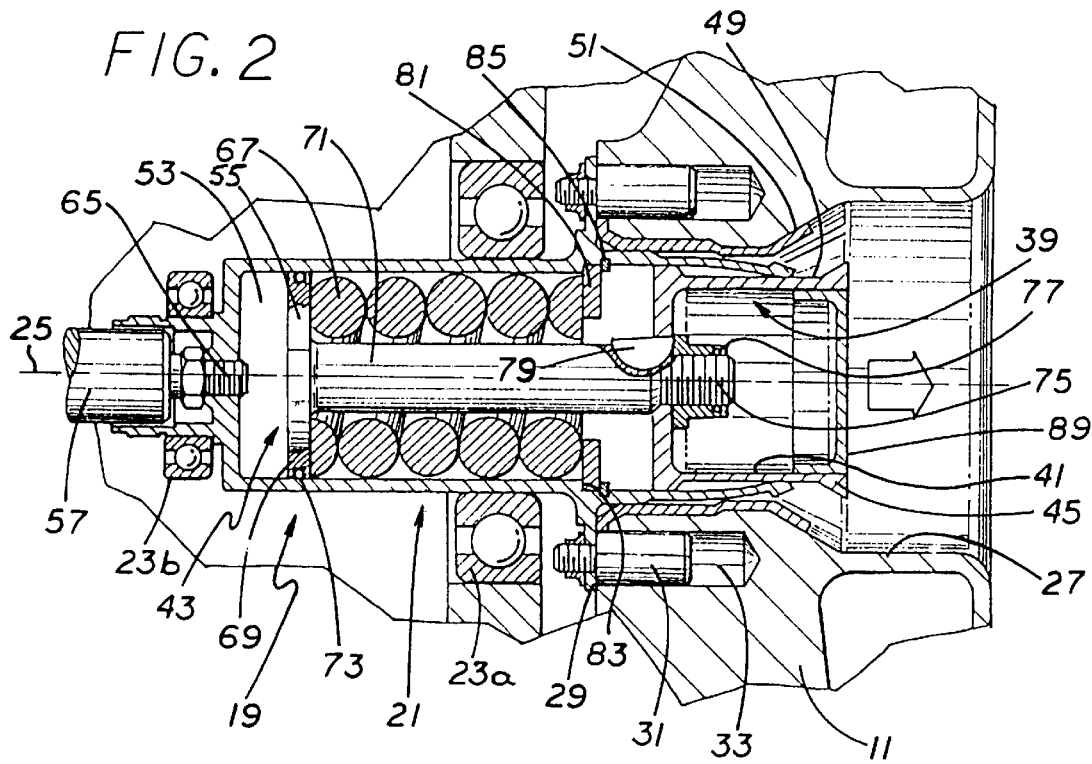
FIG. 2 is a cross-sectional view of a spindle assembly for releasably locking the wheel in place on the vehicle of FIG. 1, the spindle assembly being shown in its unlocked condition, in which the wheel can be removed and replaced.

With reference now to the illustrative drawings, and particularly to FIGS. 1 and 2, there is shown a wheel 11 mounted on a vehicle 13, with a pneumatic jack mechanism 15 lifting the vehicle above the ground 17, to allow the wheel to be removed and replaced. A spindle assembly 19 that mounts the wheel includes a generally cylindrical sleeve 21 that is supported on a pair of bearing assemblies 23a and 23b, for rotation about a spindle axis 25. The outer end of the sleeve is sized to be slidably received in a central opening 27 of the wheel. In addition, a flange 29 projects outwardly from a mid-portion of the sleeve, for mounting four lugs 31, at 90° spacing. These lugs are received in complementarily sized lug recesses 33 formed in the wheel, to prevent the wheel from rotating relative to the sleeve.

Figure 4:
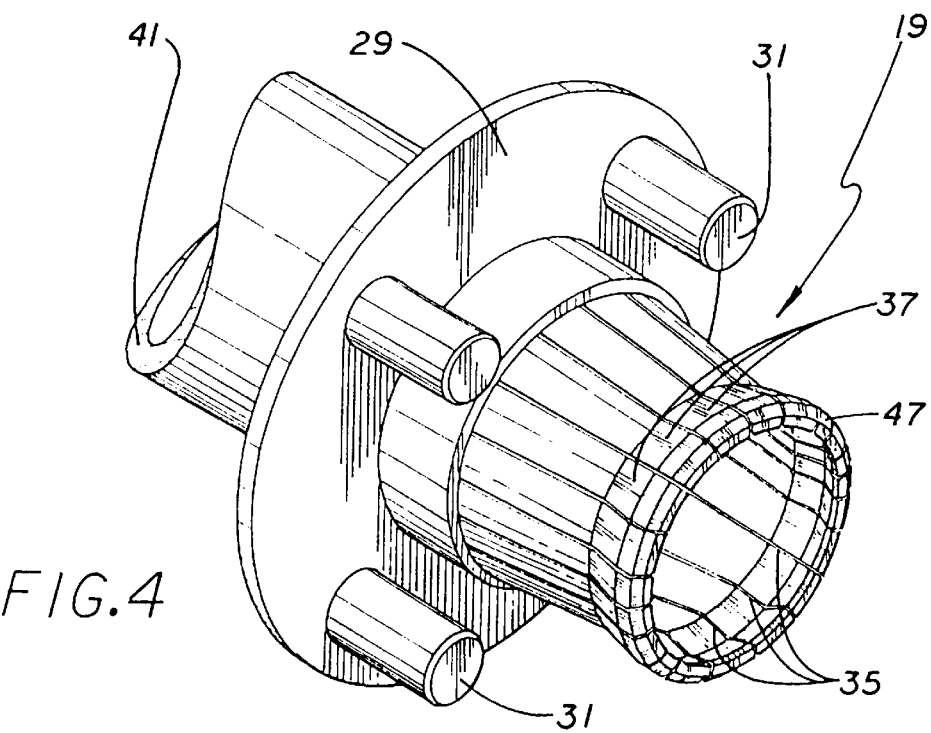
FIG. 4 is an isometric view of the slotted, outer end of the sleeve of the spindle assembly of FIG. 2, the sleeve incorporating sixteen radially deflectable fingers for use in releasably locking the wheel in place, and the sleeve also mounting four lugs for preventing the wheel from rotating relative to the spindle assembly.

To facilitate locking of the wheel 11 onto the spindle assembly 19, the outer end of the sleeve 21 is configured with sixteen longitudinal slots 35 spaced uniformly around the sleeve's circumference. These slots define sixteen radially deflectable fingers 37. The slots and fingers are depicted best in FIG. 4. In their relaxed state, the fingers all converge radially inwardly toward the spindle axis 25, with an effective diameter sufficiently small to allow the wheel's central opening 27 to slide over them.

Figure 3:
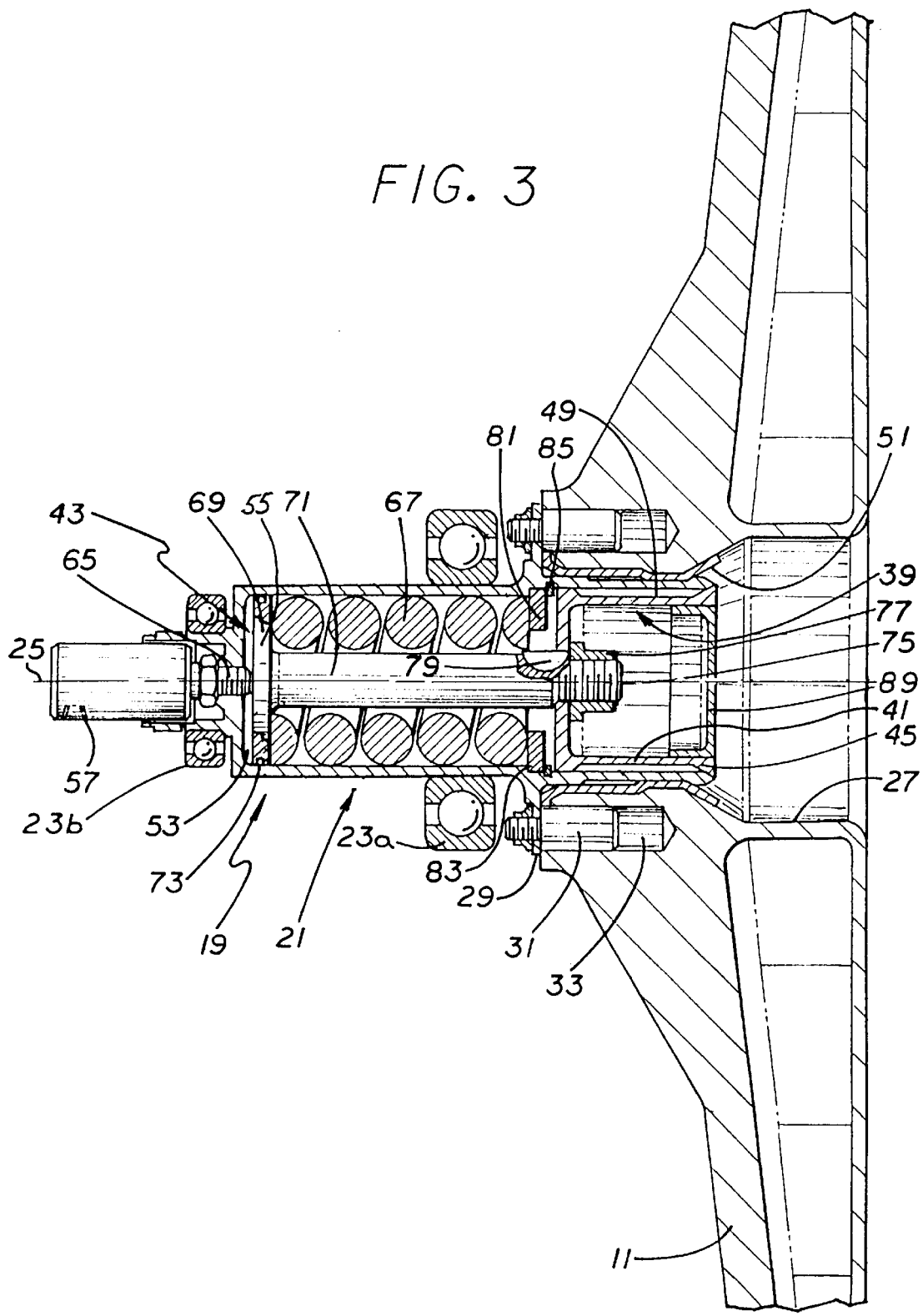
FIG. 3 is a cross-sectional view of a portion of the spindle assembly of FIG. 2, showing the assembly in its locked condition.

A cup-shaped mandrel 39 having a cylindrical side wall 41 is located within the slotted outer end of the sleeve 21. This mandrel is reciprocated axially within the sleeve by a hydraulic piston assembly 43 located within the sleeve's inner end. The piston assembly, the mandrel, and the sleeve are rotatable together about the spindle axis 25. The axial position of the mandrel determines whether or not the wheel 11 is locked onto the spindle assembly 19. In an extended position (FIG. 2), the wheel can be removed from, and replaced on, the spindle assembly, whereas in a retracted position (FIG. 3), the wheel is locked in place.

More particularly, the outer end of the mandrel 39 is configured with a beveled flange 45 that is comfortably engageable with bevels 47 formed at the outer end of the sleeve's flexible fingers 37. When the mandrel is advanced to its extended position (FIG. 2), its beveled flange moves out of engagement with the finger bevels, and the fingers move to their unflexed, radially inward position. In this unflexed position, the fingers are situated within a shallow recess 49 formed in the mandrel's cylindrical side wall 41. When the mandrel is then moved to its retracted position (FIG. 3), the beveled flange 45 conformably engages the finger bevels 47, to flex the fingers radially outwardly, into conforming engagement with the central opening 27 in the wheel 11. This central opening is defined by a steel sleeve 51, to provide a surface that is sufficiently hard to withstand the significant compressive forces provided by the fingers.

As mentioned above, the mandrel 39 is reciprocated between its retracted and extended positions by means of the hydraulic piston assembly 43, which is located within the inner end of the sleeve 21, and which is rotatable with the sleeve about the spindle axis 25. In particular, the sleeve's inner end is closed and it defines a cylindrical chamber 53 sized to conformably receive a piston 55, for sliding movement within the chamber. The piston's outer end is connected to the mandrel. A pressurized hydraulic fluid can be introduced into the chamber via a rotary union or coupler 57. The rotary coupler incorporates a non-rotating section secured by a suitable floating anchoring arm (not shown) to a portion of the vehicle's suspension (not shown), and further incorporates a rotating section secured via a threaded nozzle 65 to the sleeve's inner end. A suitable rotary coupler can be obtained from Deublin Company, of Northbrook, Ill.

The delivery of pressurized hydraulic fluid via the rotary coupler 57 and nozzle 65 to the piston assembly chamber 53 urges the piston 55 outwardly, against the yielding bias of a compressible coil spring 67. This moves the mandrel 39 outwardly, to its extended position. Releasing the hydraulic fluid pressure allows the compressible coil spring to move the mandrel back to its retracted position.

More particularly, the piston 55 includes a disc 69 and integral shaft 71 projecting outwardly from the disc. A suitable ring-shaped seal 73 is seated in a recess formed in the disc's outer periphery, for sliding engagement with the cylindrical wall of the chamber 53. The outer end of the shaft includes a threaded section 75 of reduced diameter, which is sized to fit through a central opening formed in the circular wall of the cup-shaped mandrel 39. A locknut 77 is threaded onto the shaft's outer end, to secure the shaft and mandrel together. In addition, a Woodruff key 79 is seated in aligned recesses of the shaft and mandrel, to prevent relative rotation.

The compressible coil spring 67 encircles the piston shaft 71, and it is confined between the piston disc 69 and a ring-shaped spring retainer 81 secured to the wall of the sleeve 21. The retainer is secured in place against a shallow ledge 83 formed in the sleeve's inner wall by a snap ring 85. Alternatively, the coil spring could be substituted by a set of Bellville washers.

In the preferred embodiment, the compressible coil spring 67 applies a force of about 6000 pounds to the piston 55. This force is considered sufficient to hold the mandrel 39 in its retracted position, urging the deflectable fingers 37 of the sleeve 21 into engagement with the wheel 11. The fluid pressure of the hydraulic piston assembly 43 preferably applies a force of at least about 500 pounds greater than the spring force, to move the mandrel to its extended position and allow the fingers to deflect to their radially inward positions and thus allow the wheel to be removed and replaced.

The utility of the spindle assembly 19 in facilitating a rapid removal and replacement of the wheel 11 is enhanced if it is combined with the vehicle's pneumatic jack mechanism 15. Ideally, the application of an external pressurized nitrogen source (not shown) via a connector 87 (FIG. 1) conveniently located on the vehicle 13 will simultaneously activate both the jack mechanism and a hydraulic system (not shown) that supplies a pressurized hydraulic fluid to the hydraulic piston assemblies 43 for all four wheels. In this manner, when the vehicle's tires must be replaced, the pressurized nitrogen source is connected to the connector, whereupon the vehicle's wheels are lifted above the ground 17 and the locks on all four wheels are released. The wheels thereby can be removed and replaced without the need for any supplementary tools.

The outer end of the cylindrical wall of the cup-shaped mandrel 39 is internally threaded, to receive a cap 89 in the form of an inverted cup. This prevents debris from lodging within the mandrel, and it provides a more aerodynamic surface to reduce drag.

It should be appreciated from the foregoing description that the present invention provides an improved mechanism for reliably locking a vehicle wheel to a rotatable spindle assembly. A compression spring normally biases a mandrel into engagement with a slotted sleeve, to urge a number of deflectable fingers into engagement with the wheel, to positively lock the wheel in place. However, the application of a positive hydraulic pressure to the spindle assembly overcomes the spring bias, to move the mandrel to its retracted position and thereby release the deflectable fingers from their engagement with the wheel. This allows the wheel to be removed and replaced, without the need for any supplementary tools.

Although the invention has been described in detail with reference only to the presently preferred embodiment, those of ordinary skill in the art should appreciate that various modifications can be made without departing from the invention. Accordingly, the invention is defined only by the following claims.

I claim:

1. A lockable vehicle wheel spindle apparatus for releasably mounting a vehicle wheel, comprising:

a sleeve having a plurality of fingers spaced uniformly from a spindle axis, wherein the plurality of fingers each are movable between a retracted position, in which the fingers are positioned to allow the vehicle wheel to be slidably mounted thereon, and an extended position, in which the fingers are positioned to lock the vehicle wheel in place;

a cam that reciprocates between an unlocked position, in which the plurality of fingers of the sleeve are each in their retracted position and the vehicle wheel can be slidably mounted thereon, or removed therefrom, and a locked position, in which the cam engages the plurality of fingers, to urge the fingers to their extended position, to lock the vehicle wheel in place;

a spring-bias device for biasing the cam to its locked position; and an actuator for selectively moving the cam to its unlocked position, overcoming the bias of the spring-bias device.

2. A lockable vehicle wheel spindle apparatus as defined in claim 1, wherein the sleeve includes a generally cylindrical wall having a central longitudinal axis that defines the spindle axis, and further having a plurality of slots formed in the generally cylindrical wall, to define the plurality of fingers.

3. A lockable vehicle wheel spindle apparatus as defined in claim 2, wherein the sleeve includes about sixteen uniformly configured fingers spaced substantially uniformly around the generally cylindrical wall.

4. A lockable vehicle wheel spindle apparatus as defined in claim 2, wherein:

the plurality of fingers of the sleeve are flexible;

the plurality of fingers are unflexed when in their retracted positions, and are flexed radially outward when in their extended positions; and the cam has the form of a mandrel that is located radially inward of the plurality of fingers and that reciprocates in directions aligned with the spindle axis, between its locked and unlocked positions.

5. A lockable vehicle wheel spindle apparatus as defined in claim 4, wherein:

the radially inward surface of each of the plurality of fingers has a bevel; and a radial outward surface of the cam has a bevel configured to conformably engage the bevels of the plurality of fingers.

6. A lockable vehicle wheel spindle apparatus as defined in claim 1, wherein:

the actuator includes a hydraulic piston assembly;

the apparatus further comprises a rotary coupler having a non-rotatable section secured to a portion of the vehicle's suspension and a rotatable section that mounts the sleeve, the cam, the spring-bias device, and the actuator, for rotation with the vehicle wheel about the spindle axis; and the rotary coupler is configured to couple a pressurized fluid from its nonrotatable section to its rotatable section.

7. A lockable wheel spindle apparatus as defined in claim 6, wherein the spring-bias deice includes a compression spring engaging the hydraulic piston assembly.

8. A lockable vehicle wheel spindle apparatus as defined in claim 1, wherein the radial outward surfaces of the plurality of fingers of the sleeve have a predetermined irregular shape in the direction of the spindle axis that complements the shape of a central circular opening of the wheel.

9. A lockable vehicle wheel spindle apparatus as defined in claim 1, and further comprising a plurality of lugs sized and positioned to engage recesses formed in the wheel, to prevent the wheel from rotating relative to the spindle apparatus.

10. A vehicle comprising:

a plurality of wheels, each including a central opening;

a plurality of spindle assemblies, each configured to releasably mount one of the wheels and each including a sleeve having a plurality of fingers spaced uniformly from a spindle axis, wherein the fingers are movable between a retracted position, in which the fingers are positioned to receive the central opening of one of the wheels, and an extended position, in which the fingers are positioned to lock the wheel in place, a cam that reciprocates between an unlocked position, in which the plurality of fingers are moved to their retracted position and the wheel can be mounted thereon, or removed therefrom, and a locked position, in which the cam engages the plurality of fingers, to urge the fingers to their extended position, to lock the wheel in place, and a fluid-actuatable actuator for selectively moving the cam between its locked and unlocked positions;

a fluid-actuatable lift mechanism for lifting the vehicle sufficiently above a support surface to space any wheels mounted on the plurality of spindle assemblies above the support surface; and a source of pressurized fluid selectively coupled simultaneously to both the lift mechanism and the actuators of the plurality of spindle assemblies, to space any wheels mounted on the spindle assemblies above the support surface and to move the plurality of fingers of each spindle assembly to their retracted positions, such that the wheels can be removed and replaced.

11. A vehicle as defined in claim 10, wherein:

each of the plurality of spindle assemblies further includes a spring-bias device for biasing the cam to its locked position; and the fluid-actuatable actuator of each of the plurality of spindle assemblies is sized to overcome the bias of the spring-bias device.

12. A vehicle as defined in claim 11, wherein the sleeve of each of the plurality of spindle assemblies includes a generally cylindrical wall having a central longitudinal axis that defines the spindle axis, and further having a plurality of slots formed in the generally cylindrical wall, to define the plurality of fingers.

13. A vehicle as defined in claim 12, wherein the sleeve of each of the plurality of spindle assemblies includes about sixteen uniformly configured fingers spaced substantially uniformly around the generally cylindrical wall.

14. A vehicle as defined in claim 12, wherein for each of the plurality of spindle assemblies:

the plurality of fingers of the sleeve are flexible;

the plurality of fingers are unflexed when in their retracted positions, and are flexed radially outward when in their extended positions; and the cam has the form of a mandrel that is located radially inward of the plurality of fingers and that reciprocates in directions aligned with the spindle axis, between its locked and unlocked positions.

15. A vehicle as defined in claim 14, wherein for each of the plurality of spindle assemblies:

the radially inward surface of each of the plurality of fingers has a bevel; and a radial outward surface of the cam has a bevel configured to conformably engage the bevels of the plurality of fingers.

16. A vehicle as defined in claim 11, wherein for each of the plurality of spindle assemblies:

the actuator includes a hydraulic piston assembly;

the spindle assembly further comprises a rotary coupler having a nonrotatable section secured to a portion of the vehicle's suspension and a rotatable section that mounts the sleeve, the cam, the spring-bias device, and the actuator, for rotation with the vehicle wheel about the spindle axis; and the rotary coupler is configured to couple a pressurized fluid from its nonrotatable section to its rotatable section.

17. A vehicle as defined in claim 16, wherein the spring-bias device of each of the plurality of spindle assemblies includes a compression spring engaging the hydraulic piston assembly.

18. A vehicle as defined in claim 10, wherein:

the opening formed in each of the plurality of wheels is centrally located and has a circular cross-section, with a predetermined irregular shape in the direction of the spindle axis; and the radial outward surfaces of the plurality of fingers of the sleeve of each of the plurality of spindle assemblies have a predetermined irregular shape in the direction of the spindle axis that complements the irregular shape of the opening formed in the mounted wheel.

19. A vehicle as defined in claim 18, wherein the opening formed in each wheels is defined by a hard sleeve insert.

* * * * *